W. Johnson,
Shoe Shave,

Nº 24,465. Patented June 21, 1859.

Witnesses.
Fred. Curtis
Arthur Neill

Inventor
William Johnson

UNITED STATES PATENT OFFICE.

WILLIAM JOHNSON, 2ND, OF HAMPSTEAD, NEW HAMPSHIRE.

CHAMFERING-TOOL.

Specification of Letters Patent No. 24,465, dated June 21, 1859.

*To all whom it may concern:*

Be it known that I, WILLIAM JOHNSON, 2nd, of Hampstead, in the county of Rockingham and State of New Hampshire, have invented a new and useful Improvement in Tools for Chamfering Soles for Boots or Shoes; and I do hereby declare that the same is fully described and represented in the following specification and the accompanying drawings, of which—

Figure 1:
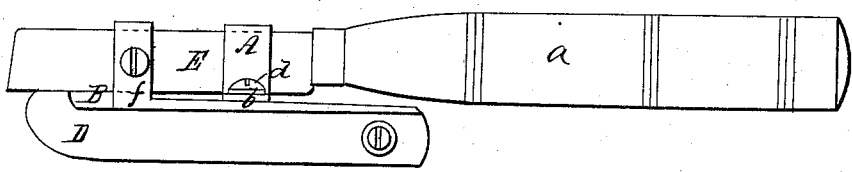
Figure 2:
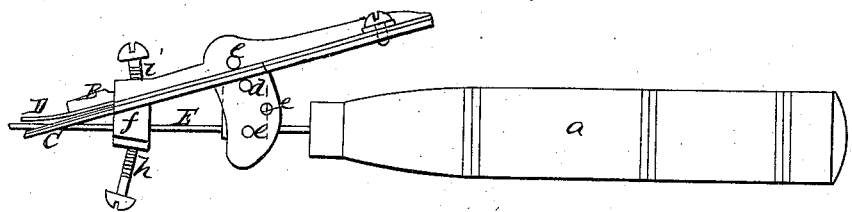
Figure 3:
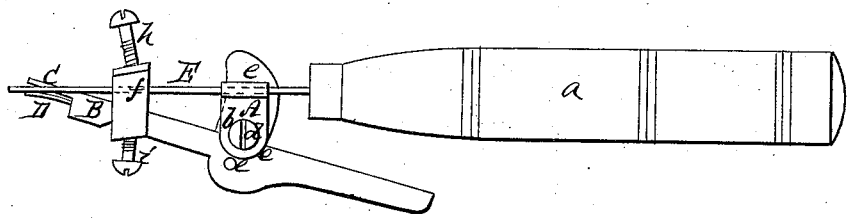
Figure 4:
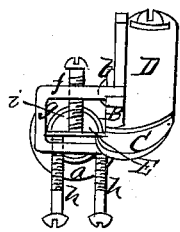

Figure 1, is a top view; Fig. 2, a front elevation; Fig. 3, a rear elevation; Fig. 4, a front end view of one of my improved chamfering tools.

Such tool as exhibited in the drawings is composed of a knife carrier A, a stationary edge bearer B, a sole rest C, a spring proper D, and a knife E, the said knife being provided with a handle $a$, the whole being arranged as shown in the figures.

From the knife carrier a lip $b$ extends upward at a right angle and against a sectoral arc or curved projection $c$, projecting downward from the sole rest C. A screw $d$ passes through the said lip $b$ and screws into one of a series of screw holes $e, e, e$, formed through the arc $c$. Between the edge bearer B and the knife carrier A there is an extension $f$ from the sole rest, the same being carried backward therefrom and furnished with an opening or passage $g$ for the reception of the knife blade which extends through the said opening as shown in the drawings and is held firmly within the same by adjusting screws $h, h, i$, arranged in the projection or part F, as shown in the drawings and so as to act against both upper and under surfaces of the knife. While the knife carrier is at liberty to turn on the screw $d$, the screws $h, h, i$, not only serve to adjust the edge of the knife with reference to the edge bearer B, but operate to hold the knife with great firmness in any position in which it may be placed. The angle of the sole rest and knife is thus securely maintained which is not the case in so advantageous a manner in the chamfering tools patented by me on October 12th, 1858, and April 12th, A. D. 1859.

Therefore, what I claim as my present invention or improvement is—

My improved mode of supporting the knife E, and adjusting it with reference to the sole rest and the edge bearer, viz, by means of a carrier A, and adjusting screws, $h, h, i$, applied and arranged with respect to the sole rest C, the edge bearer B, and the presser D, substantially as described.

In testimony whereof I have hereunto set my signature.

WILLIAM JOHNSON, 2ND.

Witnesses:
R. H. EDDY,
F. P. HALE, Jr.